United States Patent [19]

Snoy

[11] 4,442,730
[45] Apr. 17, 1984

[54] VEHICLE TRANSMISSION SYSTEM AND A SINGLE LEVER CONTROL DEVICE THEREFOR

[75] Inventor: Joseph B. Snoy, Rockford, Ill.

[73] Assignee: Twin Disc, Incorporated, Racine, Wis.

[21] Appl. No.: 297,827

[22] Filed: Aug. 31, 1981

[51] Int. Cl.³ .................. B60K 41/22; G05G 9/12
[52] U.S. Cl. .................. 74/475; 74/471 XY; 74/473 P; 74/476; 192/3.58
[58] Field of Search .......... 74/471 XY, 473 P, 475, 74/476, 866, 473 R, 471 R, 335; 192/3.58

[56] References Cited

U.S. PATENT DOCUMENTS

| | | | |
|---|---|---|---|
| 2,658,408 | 11/1953 | Miller | 74/866 |
| 2,841,659 | 7/1958 | Eitel | 74/471 XY |
| 3,093,008 | 6/1963 | Wight | 74/335 |
| 3,322,247 | 5/1967 | Luzaich | 192/3.58 |
| 3,348,643 | 10/1967 | Townsend | 192/3.58 |
| 3,360,620 | 12/1967 | Ward | 74/471 |
| 3,550,466 | 12/1970 | Ham | 74/471 XY |
| 3,613,480 | 10/1971 | Shull | 74/733 |
| 3,805,640 | 4/1974 | Schneider et al. | 74/645 |
| 3,870,986 | 3/1975 | Oka et al. | 74/471 XY |
| 4,015,488 | 4/1977 | Akeson et al. | 74/866 |
| 4,022,078 | 5/1977 | Malott | 74/475 |
| 4,067,423 | 1/1978 | Schneider et al. | 192/3.63 |
| 4,076,090 | 2/1978 | Krusche et al. | 74/471 XY |
| 4,090,414 | 5/1978 | White | 74/733 |
| 4,126,054 | 11/1978 | Langford et al. | 74/475 |
| 4,191,064 | 3/1980 | Houk et al. | 74/475 |
| 4,275,607 | 6/1981 | Snoy | 74/15.63 |

Primary Examiner—Allan D. Herrmann
Assistant Examiner—Joseph M. Rolnicki
Attorney, Agent, or Firm—James E. Nilles

[57] ABSTRACT

A transmission system for a vehicle such as a farm tractor comprises a solenoid-operated reversible multispeed transmission (twelve speeds forward and four reverse); an electronic control circuit for operating solenoids in the transmission to effect shifting; and a single lever control device including a manually operable control lever movable from neutral to forward or reverse positions and between upshift and downshift directions when in each position to operate electric switches which are connected to the electronic control circuit to effect desired shifting of the transmission.

10 Claims, 9 Drawing Figures

VEHICLE TRANSMISSION SYSTEM AND A SINGLE LEVER CONTROL DEVICE THEREFOR

BACKGROUND OF THE INVENTION

1. Field of Use

This invention relates generally to a transmission system including a solenoid-operated reversible multi-speed transmission, such as is used in vehicles, an electronic control circuit for operating the transmission solenoids, and a manually operated control device, including a control lever and electric switches, for operating the electronic control circuit to effect shifting of the transmission.

2. Description of the Prior Art

Transmission systems of said aforesaid character and others are known and shown in U.S. Pat. Nos. 4,015,488 of Apr. 5, 1977 entitled "Digital Electronic Controller For Power Transmission"; 3,613,480 of Oct. 19, 1971 entitled "Power Transmission Having Downshift Inhibitor"; 4,275,607 of June 30, 1981 entitled "Power Shaft Transmission Having Power Take-Off Shaft and Fluid Control Means Therefor"; 4,090,414 of May 23, 1978 entitled "Transmission Control System For Shuttle Type Vehicles"; 4,067,423 of Jan. 10, 1978 entitled "Control System for Rotary Drill"; and 3,805,640 of Apr. 23, 1974, entitled "Electronically Controlled Power Transmission", all of which patents have been assigned to an assignee common with the present invention. In some of such prior art systems, the manually operated control device typically comprises a housing from which a manually operable control lever extends and within which are located switches which are actuated as the control lever is moved from one position to another. Usually, the control lever is movable from a neutral position either in the forward or reverse direction to any one of several detented positions corresponding to a selected shift range or speed. Such an arrangement is sometimes time-consuming to use and, when direction reversal is required, it is necessary to downshift mechanically and electrically through all intervening shift ranges.

SUMMARY OF THE PRESENT INVENTION

In accordance with the present invention there is provided an improved transmission system, especially well adapted for use on vehicles such as farm tractors or the like, which comprises a conventional solenoid-operated reversible multispeed transmission having several speed ranges both in forward and reverse; an improved electronic control circuit for operating the solenoids in the transmission to effect shifting into neutral or into a selected speed range in a selected direction; and an improved single lever control device having a manually operable control lever and electric switches actuated by the lever and connected to the control circuit to effect shifting of the transmission.

More specifically, the single lever control device comprises a support structure on which the lever is mounted for universal movement from a neutral position to forward and reverse directions and for further movement sideways between upshift and downshift directions when in each said positions. The lever extends through a slot on a plate on the support structure, which slot is shaped so as to guide and limit travel of the lever. Manually releasable detent means are provided to maintain the lever in neutral position. The lever is connected by means of a pivot shaft on the support structure to a pivotably movable detent plate which alternately actuates a forward switch or a reverse switch mounting on the support structure when the lever is moved in forward or reverse direction, respectively, from neutral. The lever is also connected to a pivotably movable transverse lever on the support structure which alternately actuates one of a pair of upshift-/downshift switches when the lever is moved or "bumped" sideways when in forward or reverse position.

The specific embodiment disclosed herein was designed and tested for a 12-speed forward, 4-speed reverse agriculture tractor. The control device permits selection of forward motion of the vehicle by forward movement of the control handle or stick. Upshifting of the transmission when in forward position for greater speed of the vehicle is obtained by bumping the lever to the right or away from the operator. Each "bump" through the electrical circuitry shifts the transmission one successive range. Downshifting is accomplished similarly by bumping the lever to the left or toward the operator.

Reverse operation of the vehicle is obtained by rearward movement of the control stick with higher vehicle speed in reverse obtained by "bumping" the control toward the operator and lower speed by "bumping" away from the operator.

The motions involved are all natural for the desired vehicle reaction with result that no particular visual attention is required from the operator and all shifts can be made by feel or touch alone. The control device has a neutral position which is detented and requires manual lifting of the detent in order to move the control handle into a range position. The control handle is not detented in the range position so that "neutral" can be obtained instantly without any inhibition of control stick movement. A "Z" or zig-zag pattern through the neutral pattern is provided to prevent any accidental shift from one direction to the other.

Other objects and advantages of the invention will hereinafter appear.

DESCRIPTION OF A PREFERRED EMBODIMENT

Figure 1:
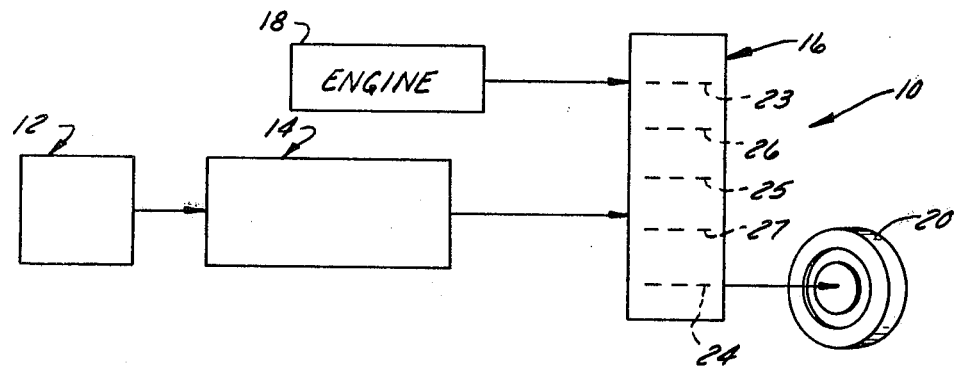
FIG. 1 is a schemtic diagram of a transmission system in accordance with the present invention.

Referring to FIG. 1, the improvement transmission system 10 comprises an improved single lever control device 12 which is electrically connected to operate an improved electronic control circuit 14 which is electrically connected to operate the solenoids in a conventional solenoid-operated transmission 16 which, for example, is employed to transmit power from an internal combustion engine 18 to the drive wheels 20 of a vehicle or tractor (not shown) of which system 10 is a part.

Figure 8:
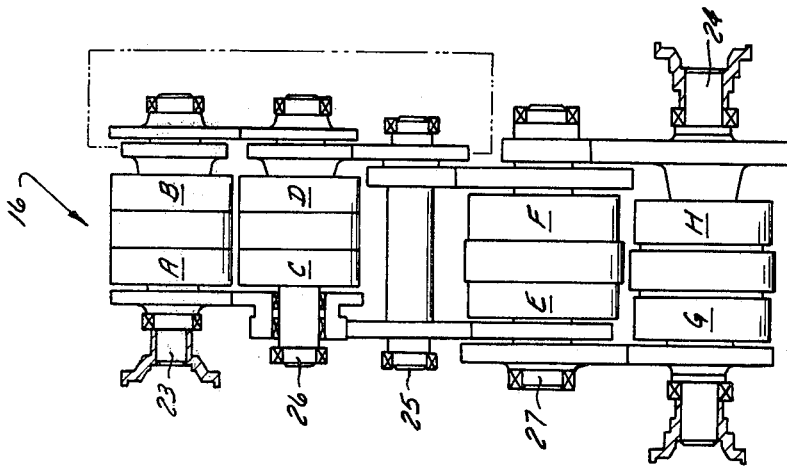
FIG. 8 is an enlarged schematic side elevational view of the transmission shown in FIG. 1.

As FIGS. 1 and 8 show, transmission 16 may take the general form of that shown in my U.S. Pat. No. 4,275,607 issued June 30, 1981. Transmission 16 includes power input and power output shafts 23 and 24, respectively, compound shaft 25, input driven shaft 26 and shaft 27. The transmission also includes a plurality of solenoid-operated clutches, a lock-up solenoid LU, and inter-meshable gears controlled thereby whereby the transmission can provide twelve speed ranges in forward and four speed ranges in reverse. More specifically, when the transmission 16 is in neutral, all clutches are disengaged. To achieve a desired one of the speed ranges in the forward or reverse directions the clutches must be engaged in the combinations as follows:

| SPEED RANGE | ENGAGE CLUTCH |
|---|---|
| FORWARD | |
| 1 | A, F, H |
| 2 | C, F, H |
| 3 | D, F, H |
| 4 | A, E, H |
| 5 | C, E, H |
| 6 | D, E, H |
| 7 | A, F, G |
| 8 | C, F, G |
| 9 | D, F, G |
| 10 | A, E, G |
| 11 | C, E, G |
| 12 | D, E, G |
| REVERSE | |
| 1 | B, F, H |
| 2 | B, E, H |
| 3 | B, F, G |
| 4 | B, E, G |

The electronic control circuit 14 shown in FIGS. 1 and 9 and hereinafter described in detail, receives electrical input signals from manually controlled lever-operated switches in single lever control device 12 and provides electrical output signals to the appropriate solenoids for the aforesaid solenoid-operated clutches and lock-up solenoid to thereby effect shifting of transmission 16 between neutral, forward and reverse and in the desired speed range. The solenoids are designated T, V, Q, S, Y, W, X and Z.

Figure 2:
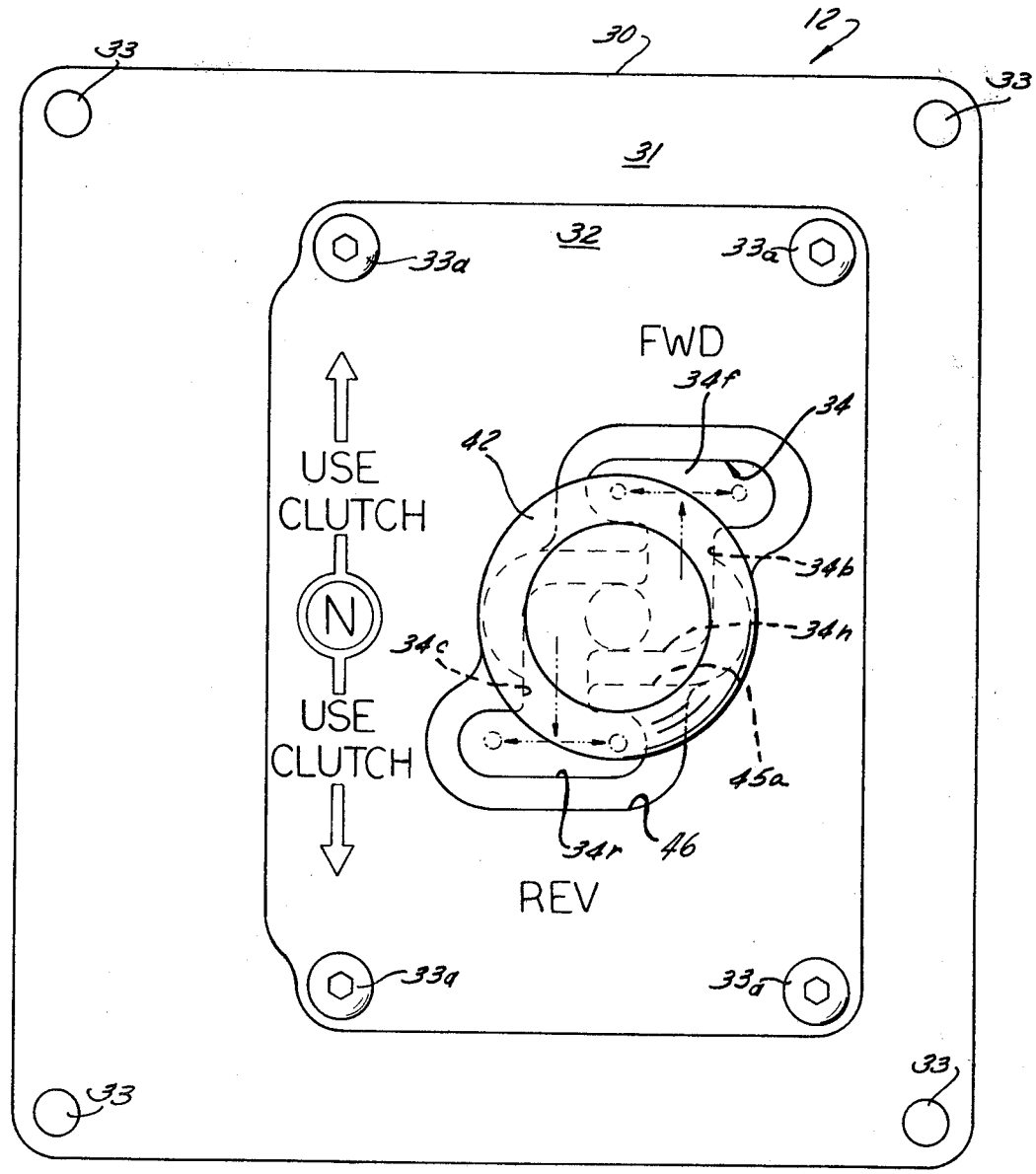
FIG. 2 is an enlarged, top plan view of a single lever control device of FIG. 1 in accordance with the present invention.

As FIGS. 2 through 7 show, single lever control device 12 comprises a support structure 30 having a shift pattern plate 31 rigidly secured to the top thereof by screws 33. As FIG. 2 shows, plate 31 is provided with a shift pattern slot 34 which includes a centrally located neutral slot 34n, a forward slot 34f, a reverse slot 34r, a slot 34b connecting slots 34n and 34f, and a slot 34c connecting slots 34n and 34r. Preferably, device 12 is mounted on a vehicle so that it is at the right side of the human operator and so that slots 34f and 34r are disposed toward the front and rear, respectively, of the vehicle. An indicator plate 32 is secured to the outer surface of shift pattern plate 31 by screws 33a and bears indicia indicative of shift positions for a control handle 36. Plate 32 includes an aperture 46 affording access to shift pattern slot 36.

Figure 4:
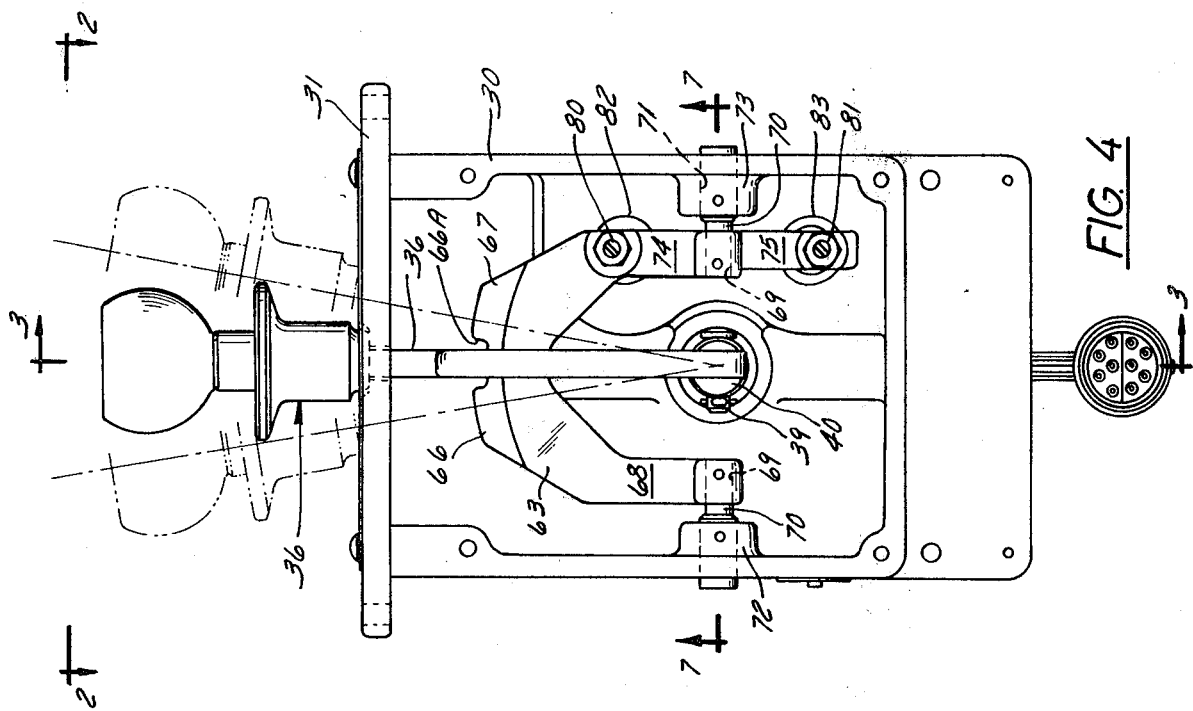
FIG. 4 is a side elevational view of one side of the control device of FIGS. 1, 2 and 3.
Figure 3:
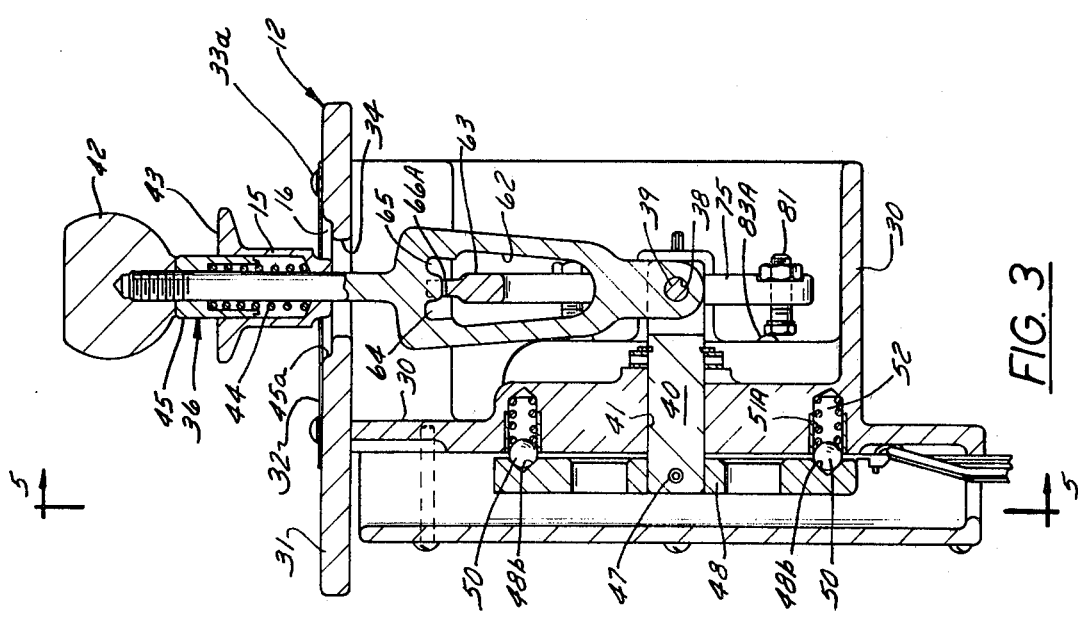
FIG. 3 is a cross sectional view of the control device taken on line 3—3 of FIG. 4.

As FIGS. 3 and 4 show, device 12 also comprises manually operable control handle 36 which is pivotably mounted on support structure 30, extends through shift pattern slot 34 in plate 31 and is movable from a neutral position in slot 34n in either the forward or reverse directions in connecting slots 34b or 34c, respectively, to the forward or reverse slots 34f or 34r, respectively, to effect forward or reverse shifting of the transmission. Handle 36 is also shiftable sideways toward and away from the human operator in each of the slots 34f or 34r to effect transmission speed changes in forward or reverse.

Handle 36 is provided at its lower end with a hole 38 for accommodating a clevis pin 39 by means of which the handle is pivotably secured to the inner end of a selector shaft 40 which is rotatably mounted in a hole 41 in support structure 30. Thus, handle 36 is universally pivotable within limits. Handle 36 is provided with a knob 42 beneath which is disposed a vertically slideable detent sleeve 43 which is biased downwardly by a compression spring 44 located between sleeve 43 and a detent or detent collar 45 on handle 36. The lower end of detent sleeve 43 is releasably engageable with a recess 45a formed in the upper surface of plate 31 immediately surrounding neutral slot 34n and operates to releasably maintain handle 36 in neutral position until intentionally moved therefrom.

Figure 5:
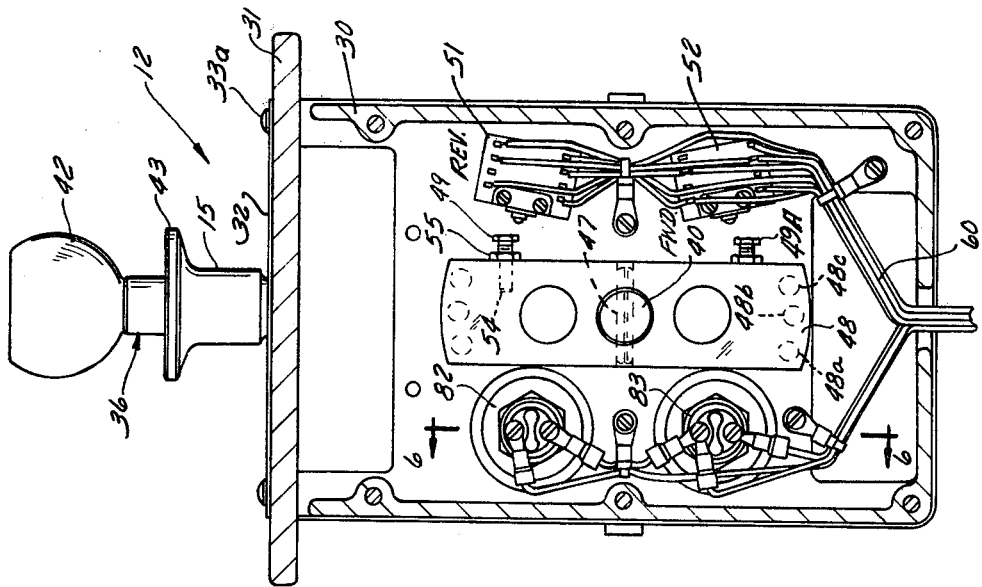
FIG. 5 is a cross sectional view of the other side of the control device taken on line 5—5 of FIG. 3.

As FIGS. 3 and 5 show, the selector shaft 40 hereinbefore referred to has its outer end connected by a roll pin 47 to a detent plate 48 which is provided with three detent holes 48a, 48b, 48c at each end, which holes cooperate with balls or ball detents 50 mounted in bores 51A in support structure 30 and outwardly biased by compression springs 52 to releasably maintain plate 48 and handle 36 in neutral, forward or reverse positions. Detent plate 48 is also provided at its upper and lower ends with adjustably positionable direction switch actuators 49 and 49A which are engageable with the direction switches 51 and 52, respectively, which are rigidly mounted on the outer side of support structure 30, as FIG. 5 shows. Each actuator 49, 49A takes the form of a bolt receivable in a threaded hole 54 in the edge of plate 48 and adjustably positionable by a nut 55. When handle 36 and plate 48 are in neutral, neither upper reverse direction switch 51 or lower forward direction switch 52 is actuated. However, when handle 36 and plate 48 are moved to forward or reverse positions, either switch 52 or 51 is actuated. Each switch 51, 52 may be a snap action switch having as many internal switching elements (not shown) and exterior connecting leads 60 as are necessary to make the switch compatible with the particular form of control circuit 14 employed.

As FIGS. 3 and 4 show, handle 36 is provided with a central opening 62 for accommodating a generally U-shaped lever 63 which extends therethrough. Opening 62 is provided at its upper end with a pair of spaced apart notches 64 and 65 which receive upwardly extending projections 66 and 67 (having a notch 66A therebetween), respectively, on the upper side of lever 63 when handle 36 is moved from neutral to its forward and reverse positions, respectively. Lever 63 is pivotably mounted on support structure 30 so as to be shiftable sideways toward and away from the human operator when handle 36 is so moved while in the forward or reverse position. Specifically, inverted, U-shaped lever 63 is provided on each of its lower legs 68, 74 with a hole 69 for accommodating a pivot pin 70, which pin is mounted in a hole 71 in either the forward wall 72 or rear wall 73 of support structure 30. The rear leg 74 of lever 63 is provided with a lower extension 75.

Figure 6:
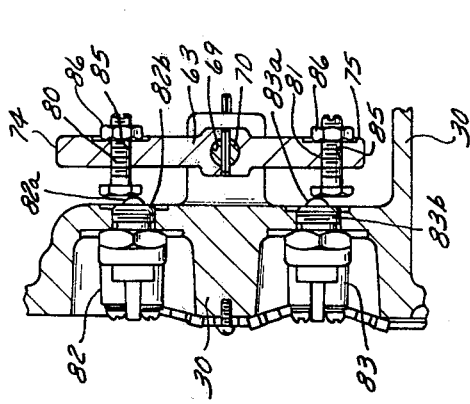
FIG. 6 is a cross-sectional view taken on line 6—6 of FIG. 5.
Figure 7:
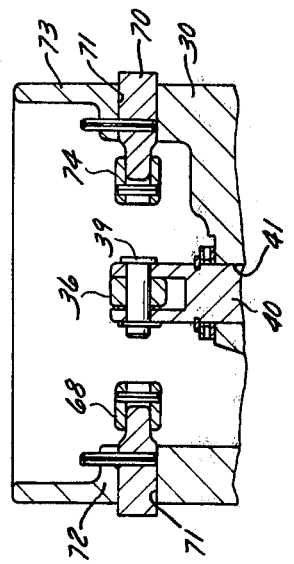
FIG. 7 is a cross sectional view taken on line 7—7 of FIG. 4.

As FIGS. 4 and 6 show, leg 74 and extension 75 is provided with adjustably positionable speed range selector switch actuators 80 and 81 which are engageable with the speed range selector switches 82 and 83, respectively, which are rigidly mounted on the outer side of support structure 30. The switches 82 and 83 have pushbutton actuators 82a and 83a, respectively, which extend through holes 82b and 83b respectively, in structure 30 and are accessible to the actuators 80 and 81. Each actuator 80, 81 takes the form of a bolt receivable in a threaded hole 85 in leg 74 and extension 75 and is adjustably positionable by a nut 86. When handle 36 and lever 63 are in neutral, neither switch 82 or 83 is actuated. However, when handle 36 is moved to forward position and then shifted sideways away from the operator, lower switch 83 is actuated by actuator 81 and lower switch 83 performs an upshift function. If, while handle 36 is still forward, it is shifted sideways toward the operator, lower switch 83 is deactuated and upper switch 82 is actuated by actuator 80 and upper switch 82 performs a downshift function. Conversely, when handle 36 is in reverse position, shifting handle 36 sideways away from the operator causes lower switch 83 to be actuated to perform a downshift function and shifting handle 36 sideways toward the operator causes upper switch 82 to be actuated to perform an upshift function. This reverse result comes about because action of forward or reverse switch 51 or 52, respectively, conditions the control circuit 14 to so operate.

Figure 9:
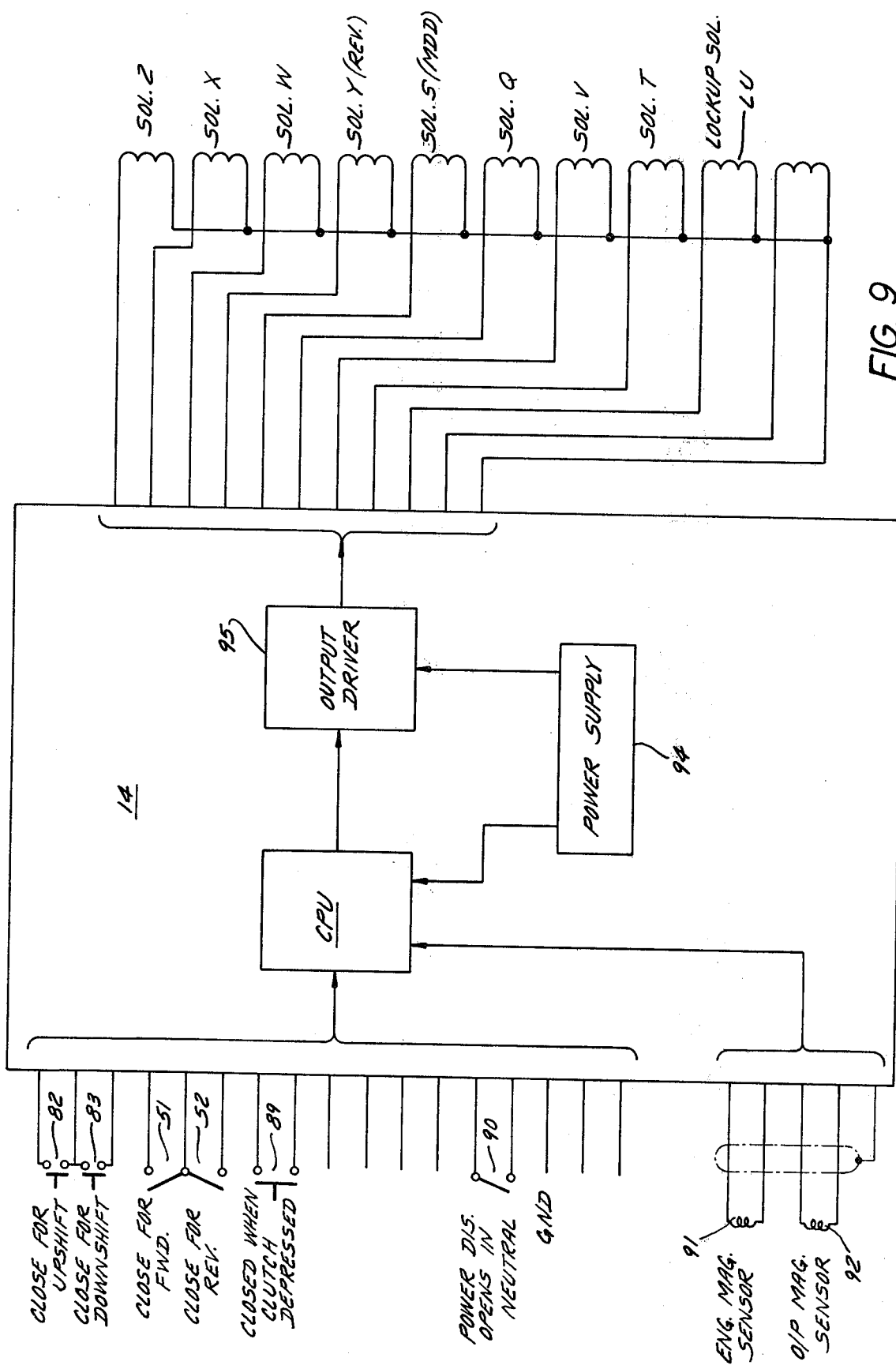
FIG. 9 is an enlarged schematic diagram of the control circuit shown in FIG. 1.

As FIG. 9 shows, control circuit 14 receives input signals from the forward switch 51, from the reverse switch 52, from the upshift/downshift speed range selector switches 82 and 83, from a clutch actuation switch 89, from a power disconnect switch 90 which opens in neutral, and from speed sensing devices 91 and 92 located on the engine 18 and transmission 16, respectively. Control circuit 14, which includes a power supply 94 and output driver 95, processes such incoming signals in accordance with a logic circuit CPU (central processing unit) therewithin so as to provide appropriate output signals to the clutch solenoids and lock-up solenoid LU of transmission 16 to effect appropriate shifting operation of the latter, as hereinbefore described.

DESCRIPTION OF OPERATION

As appears from the foregoing, switch 51 controls reverse motion of the vehicle and switch 52 controls forward motion of the vehicle. These switches are actuated by fore and aft motion of the control handle 36 through selector shaft 40, detent plate 48 and adjusting screws 49 and 49A. Detent plate 48 is retained in forward, neutral or reverse positions with ball detents 50.

Upshift and downshift ball switches 82 and 83 control upshifting and downshifting. These switches are actuated by rotation of lever 63 about pins 70 through adjusting screws 80 and 81.

Control handle 36 has a second degree of motion about clevis pin 39 which center of rotation is in alignment with pins 70 about which lever 63 rotates. Control handle 36 engages lever 63 by means of notch 64 when handle 36 is in Forward position and notch 65 when in Reverse position. Through this engagement, the up and down shifting switches 82 and 83 are operated by sideways motion of the handle 36.

The handle 36 is moved to align with the forward and reverse notches 64, 65 when in the neutral position by passing through notch 66A in lever 63.

Detent sleeve 43 is restrained by recess 45a in neutral position only and must be manually lifted to put the handle 36 into Forward or Reverse.

I claim:
1. A transmission system comprising:
a reversible multispeed transmission;
solenoids operable to shift said transmission into forward and reverse and into selected speed ranges;
an electronic control circuit for receiving input signals and providing output signals to operate said solenoids;
and a control device including a support structure, a manually movable handle mounted on said support structure and switches on said support structure actuatable by said handle to provide input signals to said electronic control circuit, said switches including a forward switch, a reverse switch, and a pair of speed range selector switches;
said handle being pivotably movable along a first path from neutral position in one direction to forward or in an opposite direction to reverse position to effect actuation of said forward switch or said reverse switch, respectively;
said handle being further pivotably movable along another path transverse to said first path in opposite directions when in forward or reverse positions to effect actuation of one or the other of said speed range selector switches; first releasable means for maintaining said handle in forward or reverse position; and second releasable means including a detent on said handle releasably engageable with said support structure for maintaining said handle in neutral position.

2. In combination:
a transmission having an input shaft, an output shaft and a plurality of solenoid-operable clutches operable to put the transmission in any one of a plurality of ranges in either forward or reverse;
a plurality of solenoids connected for operating said clutches; and means for operating said solenoids comprising a control circuit connected to effect energization of said solenoids and a single lever control device;
said single lever control device comprising a support structure and a lever pivotably movable along a first path from neutral position in opposite directions to either a forward position or a reverse position, and said lever being further pivotably movable along another path transverse to said first path in opposition directions between two positions when in forward position or reverse position,
first and second switches connected to said control circuit and responsive to placement of said lever in forward and reverse position, respectively, to place said control circuit in readiness to effect forward or reverse shifting, respectively;
third and fourth switches connected to said control circuit and responsive to movements of said lever along said other path to effect upshift or downshift of said transmission in forward or reverse; first releasable means for maintaining said handle in forward or reverse positions; and second releasable means including a detent on said handle releasably engageable with said support structure for maintaining said handle in neutral position.

3. A control device for providing electric signals to an electronic control circuit for operating solenoids in a reversible multispeed solenoid-operated transmission, comprising:

a support structure;

a manually operable handle movably mounted on said support structure;

a forward switch, a reverse switch, and a pair of speed range selector switches mounted on said support structure;

said handle being pivotably movable along a first path from neutral to either forward or reverse positions wherein said forward or reverse switches, respectively, are actuated by said handle, said handle being further pivotably movable along a path transverse to said first path when in either said forward or reverse positions to effect actuation of said selector switches; first releasable means for maintaining said handle in forward or reverse positions; and second releasable means including a detent on said handle releasably engageable with said support structure for maintaining said handle in neutral position.

4. A control device according to claim 1 or 2 or 3 wherein said first releasable means includes detents.

5. A control device comprising:

a support structure;

a manually operable handle;

means for mounting said handle for universal pivotal movement on said structure;

a shift pattern plate on said structure having a shift pattern slot therein through which said handle extends;

said slot defining a neutral position and a forward position and a reverse position connected to said neutral position whereby said handle is movable fore and aft along a first path and also movable in a transverse direction to said path in each of said forward and reverse positions;

a detent plate movably mounted on said structure movable by said handle between two positions as said handle is moved fore and aft;

a forward switch and a reverse switch mounted on said structure and actuatable alternately by said detent plate as the latter moves between said positions;

a selector switch lever movably mounted on said structure and movable by said handle between two positions as said handle is moved in said transverse direction when in either forward or reverse positions;

and a pair of speed selector switches mounted on said structure and actuatable alternately by said selector switch lever as the latter is moved between said two positions.

6. A control device according to claim 5 including means operatively connected between said detent plate and said structure to releasably maintain said handle in said neutral, forward or reverse positions.

7. A control device according to claim 5 including means operatively connected between said handle and said shift pattern plate to releasably maintain said handle in said neutral position.

8. A control device according to claim 5 wherein said handle is provided with an opening therethrough through which said selector switch lever extends.

9. In an electronic control circuit responsive to a control device to effect operation of solenoid circuits for solenoids in a solenoid-operated transmission, said control device comprising a forward switch, a reverse switch, and a pair of upshift/downshift switches, in combination:

first and second circuits responsive to actuation of said forward and reverse switches, respectively, to effect operation of the forward and reverse solenoid circuits, respectively;

a third circuit responsive to actuation of one of said upshift/downshift switches when said first circuit is responding to actuation of said forward switch to effect operation of at least one solenoid circuit to effect an upshift;

and a fourth circuit responsive to actuation of the other of said upshift/downshift switches when said first circuit is responding to actuation of said forward switch to effect operation of at least one solenoid circuit to effect a downshift; said third circuit being further responsive to actuation of said one switch when said second circuit is responding to actuation of said reverse switch to effect operation of at least one solenoid circuit to effect a downshift;

said fourth circuit being further responsive to actuation of said other switch when said second circuit is responding to actuation of said reverse switch to effect operation of at least one solenoid circuit to effect an upshift.

10. A control device according to claim 9 including a fifth circuit responsive to non-actuation of both said forward and reverse switches to effect operation of at least one solenoid circuit to effect a neutral condition.

* * * * *